US010931724B2

(12) United States Patent
Unitt et al.

(10) Patent No.: US 10,931,724 B2
(45) Date of Patent: Feb. 23, 2021

(54) SYSTEM AND METHOD FOR INTEGRATED VIRTUAL ASSISTANT-ENHANCED CUSTOMER SERVICE

(71) Applicant: NEWVOICEMEDIA, LTD., Basingstoke (GB)

(72) Inventors: Ashley Unitt, Basingstoke (GB); Brian R. Galvin, Silverdale, WA (US)

(73) Assignee: NEWVOICEMEDIA LTD., Hampshire (GB)

( * ) Notice: Subject to any disclaimer, the term of this patent is extended or adjusted under 35 U.S.C. 154(b) by 0 days.

(21) Appl. No.: 15/876,885

(22) Filed: Jan. 22, 2018

(65) Prior Publication Data
US 2019/0028587 A1    Jan. 24, 2019

Related U.S. Application Data

(60) Provisional application No. 62/534,166, filed on Jul. 18, 2017.

(51) Int. Cl.
*H04L 29/06* (2006.01)
(52) U.S. Cl.
CPC .................................. *H04L 65/40* (2013.01)
(58) Field of Classification Search
CPC ... H04M 3/5183; H04M 3/5191; G06F 9/453; G06Q 30/016; H04L 29/06387; H04L 65/40
See application file for complete search history.

(56) References Cited

U.S. PATENT DOCUMENTS

| 6,757,362 | B1 | 6/2004 | Cooper et al. |
| 6,944,799 | B1* | 9/2005 | Seeley ................ H04L 43/50 379/265.02 |
| 9,106,724 | B1* | 8/2015 | Harris ................ H04L 51/16 |
| 9,596,350 | B1 | 3/2017 | Dymshyts et al. |
| 9,729,592 | B2 | 8/2017 | Slayton et al. |
| 10,277,743 | B1* | 4/2019 | Agarwal ............. G10L 15/22 |
| 2006/0031486 | A1* | 2/2006 | Miner ................ G06F 16/48 709/224 |
| 2006/0167970 | A1* | 7/2006 | Seeley ............... H04M 3/5191 709/202 |
| 2009/0161838 | A1* | 6/2009 | Schultz .............. H04M 3/5191 379/88.04 |
| 2011/0164610 | A1* | 7/2011 | Cabasse ............. H04M 7/003 370/352 |
| 2013/0054684 | A1* | 2/2013 | Brazier ............. H04M 3/5231 709/203 |

(Continued)

*Primary Examiner* — Lance Leonard Barry
(74) *Attorney, Agent, or Firm* — Brian R. Galvin; Galvin Patent Law LLC

(57) ABSTRACT

A system for virtual assistant facilitated contact center communications, wherein a virtual assistant at a contact center is used to communicate with a virtual assistant operating on a user device, thereby automating and improving contact center to customer communications. When a service request is received at a virtual assistant at the contact center from a virtual assistant operating on a user device, the virtual assistant at the contact center exchanges messages with one or more internal systems at the contact center to obtain relevant information. If any of the internal systems identifies missing information, the virtual assistant at the contact center queries the virtual assistant on the user device for the missing information.

5 Claims, 14 Drawing Sheets

(56) References Cited

U.S. PATENT DOCUMENTS

| | | | |
|---|---|---|---|
| 2013/0301820 A1* | 11/2013 | Williams | G06Q 10/02 |
| | | | 379/201.01 |
| 2014/0244712 A1 | 8/2014 | Walters et al. | |
| 2015/0016600 A1* | 1/2015 | Desai | H04M 3/5232 |
| | | | 379/266.07 |
| 2015/0088514 A1* | 3/2015 | Typrin | G06F 3/167 |
| | | | 704/249 |
| 2015/0185996 A1* | 7/2015 | Brown | G06F 3/04817 |
| | | | 715/706 |
| 2015/0186156 A1 | 7/2015 | Brown et al. | |
| 2016/0308799 A1* | 10/2016 | Schubert | H04L 51/02 |
| 2017/0032027 A1* | 2/2017 | Mauro | G06F 16/3329 |
| 2017/0149969 A1* | 5/2017 | Mockus | H04M 3/5108 |
| 2017/0346948 A1* | 11/2017 | Wolf | H04M 7/0039 |
| 2017/0357478 A1* | 12/2017 | Piersol | G10L 15/30 |
| 2018/0061393 A1* | 3/2018 | Osotio | G10L 25/63 |

* cited by examiner

SYSTEM AND METHOD FOR INTEGRATED VIRTUAL ASSISTANT-ENHANCED CUSTOMER SERVICE

CROSS-REFERENCE TO RELATED APPLICATIONS

This application claims benefit of, and priority to, U.S. provisional patent application Ser. No. 62/534,166, titled "SYSTEM AND METHOD FOR INTEGRATED VIRTUAL ASSISTANT-ENHANCED CUSTOMER SERVICE", which was filed on Jul. 18, 2017, the entire specifications of each of which are incorporated herein by reference.

BACKGROUND OF THE INVENTION

Field of the Art

The disclosure relates to the field of contact centers, and more particularly to the field of integrating consumer-facing virtual assistants with contact centers to deliver virtual assistant-enhanced customer service.

Discussion of the State of the Art

As Virtual Assistants (VAs) become more and more widespread, and particularly as they are applied to home control and home assistant functions (as exemplified by AMAZON ECHO™), they become a natural entry point for consumers to interact with enterprises. Today, when consumers interact in real time with enterprises (other than when they visit the premises of enterprises, such as when they visit a retail establishment or a bank branch), they generally do via one of the enterprise's contact centers. While virtual assistants today can make calls (sometimes limited to calls to other users of the same type virtual assistant; it is common in the art for virtual assistants to be provided by companies such as AMAZON™ and APPLE™ via a comprehensive VA platform, and calls may be made between users of such platforms without using traditional telephony), they do not take advantage of information and capabilities available in contact centers widely in use in the art.

What is needed are a system and various methods for integrated virtual assistant-enhanced customer service.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
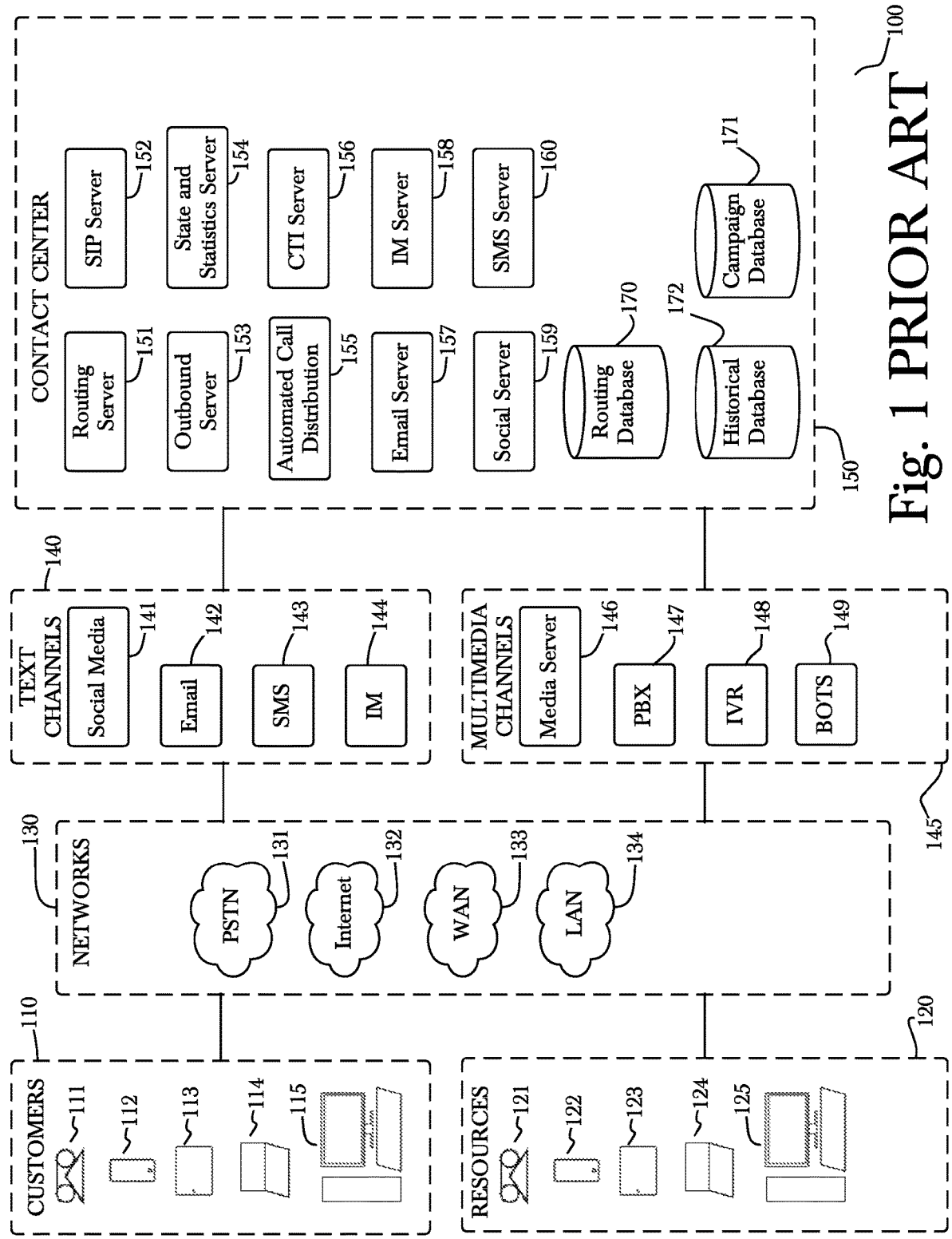
FIG. 1 (PRIOR ART) is a typical system architecture diagram of a contact center including components commonly known in the art.

The inventor has conceived, and reduced to practice, a system and method for integrated virtual assistant-enhanced customer service.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 (PRIOR ART) is a typical system architecture diagram of a contact center 100, known to the art. A contact center is similar to a call center, but a contact center has more features. While a call center only communicates by voice, a contact center adds email, text chat such as but not limited to instant messaging, social media posts and SMS interaction, and web interfaces to voice communication in order to facilitate communications between a customer endpoint 110, and a resource endpoint 120, through a network 130, by way of at least one interface, such as a text channel 140 or a multimedia channel 145 which communicates with a plurality of contact center components 150. A contact center 100 is often operated through an extensive open workspace for agents with work stations that may include a desktop computer 125 or laptop 124 for each resource 120, along with a telephone 121 connected to a telecom switch, a mobile smartphone 122, and/or a tablet 123. A contact center enterprise may be independently operated or networked with additional centers, often linked to a corporate computer network 130. Resources are often referred to as agents, but for inside sales, for example, they may be referred to as sales representatives, or in other cases they may be referred to as service representatives, or collection agents, etc. Resource devices 120 may communicate in a plurality of ways, and need not be limited to a sole communication process. Resource devices 120 may be remote or in-house in a contact center, or out-sourced to a third party, or working from home. They handle communications with customers 110 on behalf of an enterprise. Resource devices 120 may communicate by use of any known form of communication known in the art be it by a telephone 121, a mobile smartphone 122, a tablet 123, a laptop 124, or a desktop computer 125, to name a few examples. Similarly, customers 110 may communicate in a plurality of ways, and need not be limited to a sole communication process. Customer devices 110 may communicate by use of any known form of communication known in the art, be it by a telephone 111, a mobile smartphone 112, a tablet 113, a laptop 114, or a desktop computer 115, to name a few examples. Communications by telephone may transpire across different network types, such as public switched telephone networks, PSTN 131, or via an internet network 132 for Voice over Internet Protocol (VoIP) telephony. Similarly, VoIP or web-enabled calls may utilize a Wide Area Network (WAN) 133 or a Large Area Network 134 to terminate on a media server 146. Network types are provided by way of example, only, and should not be assumed to be the only types of networks used for communications. Further, resource devices 120 and customer devices 110 may communicate with each other and with backend services via networks 130. For example, a customer calling on telephone handset 111 may connect through PSTN 131 and terminate on a private branch exchange, PBX 147, which is a type of multimedia channel 145. A video call originating from a tablet 123 may connect through an internet connection 132 and terminate on a media server 146. A customer device such as a smartphone 112 may connect via a WAN 133, and terminate on an interactive voice response unit, IVR 148, such as in the case of a customer calling a customer support line for a bank or a utility service. Text channels 140, may comprise social media 141, email 142, SMS 143 or as another form of text chat, IM 144, and would communicate with their counterparts, each respectively being social server 159, email server 157, SMS server 160, and IM server 158. Multimedia channels 145 may comprise at least one media server 146, PBX 147, IVR 148, and/or BOTS 149. Text channels 140 and multimedia channels 145 may act as third parties to engage with outside social media services and so a social server 159 inside the contact center will be required to interact with the third party social media 141. In another example, an email server 157 would be owned by the contact center 100 and would be used to communicate with a third party email channel 142. The multimedia channels 145, such as media server 146, PBX 147, IVR 148, and BOTS 149, are typically present in an enterprise's datacenter, but could be hosted in a remote facility or in a cloud facility or in a multifunction service facility. The number of communication possibilities are vast between the number of possible resource devices 120, customer devices 110, networks 130, channels 140/145, and contact center components 150, hence the system diagram on FIG. 1 indicates connections between delineated groups rather than individual connections for clarity.

Continuing on FIG. 1 (PRIOR ART), shown to the right of text channels 140, and multimedia channels 145, are a series of contact center components 150, including servers, databases, and other key modules that may be present in a typical contact center, and may work in a black box environment where internal operation is concealed and only input and output data may be readily visible to observers, and may be used collectively in one location or may be spread over a plurality of locations, or even be cloud-based, and more than one of each component shown may be present in a single location or may be cloud-based or may be in a plurality of locations or premises. Contact center components 150, may comprise a routing server 151, a SIP server 152, an outbound server 153, a computer telephony integration server CTI 154, a state and statistics server (also known and referred to herein as a STAT server) 155, an automated call distribution facility, ACD 156, an email server 157, an IM server 158, a social server 159, a SMS server 160, a routing database 170, a historical database 172, and a campaign database 171. It is possible that other servers and databases may exist within a contact center, but in this example, the referenced components are used. Additionally, a server may be a physical device or may be a virtual or hosted device, such as a cloud-hosted server provided by a service provider for use, or an off-site server that may be accessed or utilized remotely. Continuing with the example given above, in some conditions where a single medium (such as ordinary telephone calls) is used for interactions that require routing, media server 146 may be more specifically a private branch exchange (PBX) 147, automated call distributor (ACD) 156, or similar media-specific switching system. Generally, when interactions arrive at media server 146, a route request, or a variation of a route request (for example, a SIP invite message), is sent to session initiation protocol SIP server 152, or to an equivalent system such as a computer telephony integration (CTI) server 154. A route request is a data message sent from a media-handling device such as media server 146 to a signaling system such as SIP server 152, the message comprising a request for one or more target destinations to which to send (or route, or deliver) the specific interaction with regard to which the route request was sent. SIP server 152 or its equivalent may, in some cases, carry out any required routing logic itself, or it may forward the route request message to routing server 151. Routing server 151 executes, using statistical data from state and statistics server (STAT server) 155 and (at least optionally) data from routing database 170, a routing script in response to the route request message and sends a response to media server 146 directing it to route the interaction to a specific target resource 120. In another case, routing server 151 uses historical information from a historical database 172, or real time information from campaign database 171, or both, as well as configuration information (generally available from a distributed configuration system, not shown for convenience) and information from routing database 170. STAT server 154 receives event notifications from media server 146 or SIP server 152 (or both) regarding events pertaining to a plurality of specific interactions handled by media server 146 or SIP server 152 (or both), and STAT server 155 computes one or more statistics for use in routing based on the received event notifications. Routing database 170 may of course be comprised of multiple distinct databases, either stored in one database management system or in separate database management systems. Examples of data that may normally be found in routing database 170 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 120 (which may be human agents, automated software agents, interactive voice response scripts, and so forth); data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 155, routing database 170, campaign database 172, historical database 171, and any associated configuration systems, routing server 151 selects a routing target from among a plurality of available resource devices 120, and routing server 151 then instructs SIP server 152 to route the interaction in question to the selected resource device 120, and SIP server 152 in turn directs media server 146 to establish an appropriate connection between customer devices 110 and target resource device 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customer devices 110 are generally, but not necessarily, associated with human customers or users. Nevertheless, it should be understood that routing of other work or interaction types is possible, although in any case, is limited to act or change without input from a management team.

Figure 2:
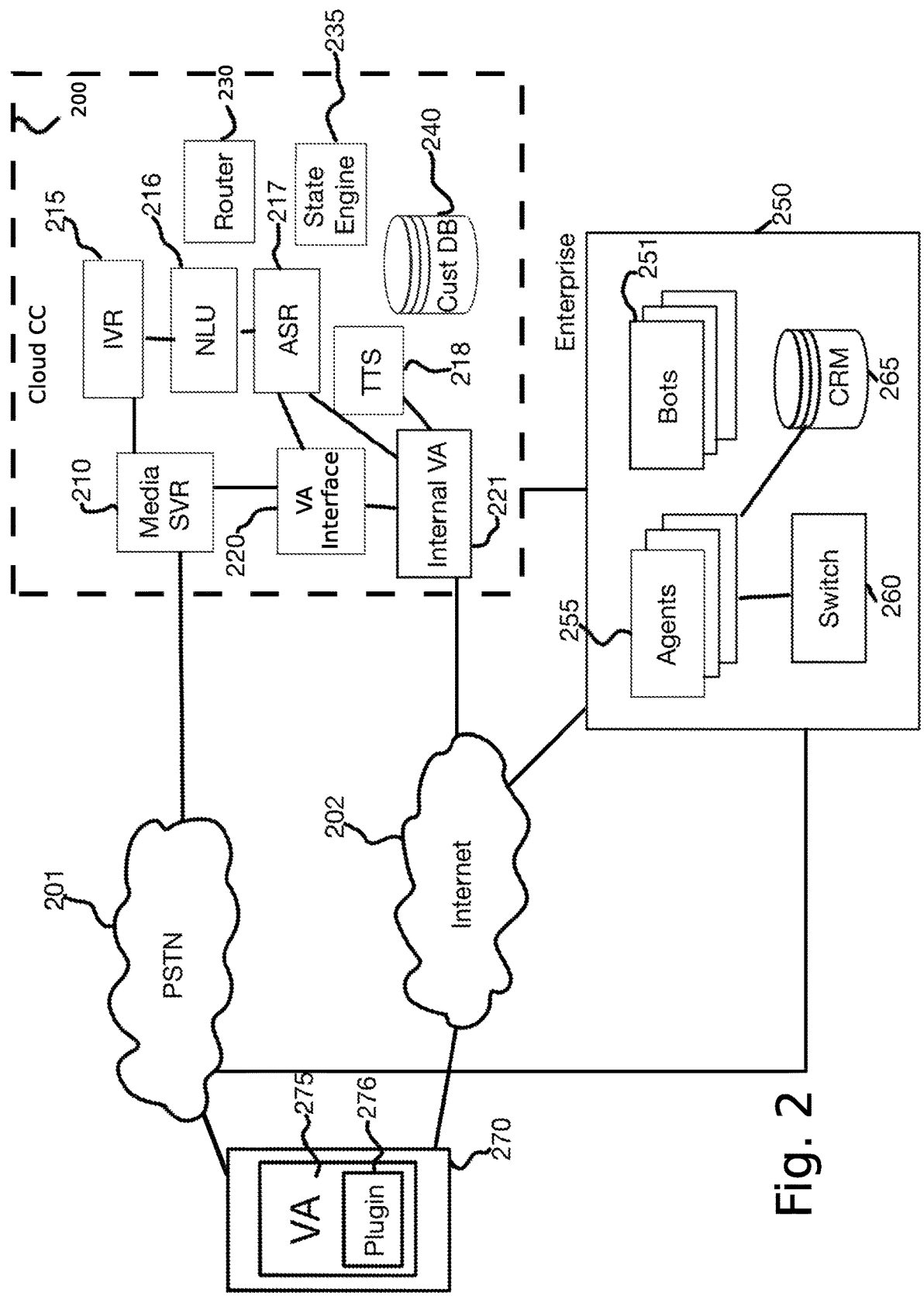
FIG. 2 is a system diagram illustrating an exemplary system architecture for a system for integrated virtual assistant-enhanced customer service, according to a preferred embodiment.

FIG. 2 is a system diagram illustrating an exemplary system architecture for a system for integrated virtual assistant-enhanced customer service, according to a preferred embodiment. As shown, virtual assistant 275 is operated by a user, typically of a mobile device 270, using spoken commands (although text-based virtual assistants and mixed-mode VA's are known in the art). VA 275 may be a fully-functional, unmodified VA such as APPLE SIRI™ or AMAZON ALEXA™, or it may be a VA with a plugin 276, such as an ALEXA™ skill (or similar vendor-specific plugin type). Virtual assistant 275 may communicate via the Internet 202 and/or a public switched telephony network 201 to interact with (for example, exchange messages and/or establish synchronous sessions with) one or more contact centers such as cloud contact center 200 to intercede on behalf of its user or to provide enhanced customer service from one or more enterprises to the user of VA 275. A cloud contact center (or, in another aspect, premise-based or hybrid-architecture contact centers) may be structured similarly to the contact center described in FIG. 1. In general, cloud contact center 200 will comprise, in addition to typical contact center components such as a router 230, a media server 210, and an interactive voice response (IVR) 215. Typically, one or more state engines 235 will be provided, to maintain state information pertaining to contact center components (including resources such as agents 255 and bots 251, which may be hosted and/or resident in enterprise 250, that is, remotely from cloud contact center 200. Although often combined or operating within IVR 215, text-to-speech (TTS) server 218, automated speech recognition (ASR) server 217, and natural language understanding (NLU) server 216 may be implemented as standalone computing devices or services, including as services operating on clustered computing devices. Moreover, TTS 218, ASR 217, and NLU 216 may be operated by a third party such as a platform for providing VA services (e.g., AMAZON ALEXA™ platform or APPLE SIRI™ platform, among many others). In order to interact with VA 275, cloud contact center may also comprise a VA interface 220, which is described more fully (in an exemplary aspect) with reference to FIG. 3, and an internal virtual assistant 221, which may act on behalf of one or more enterprises (possibly with configurable and dynamically changing branding and/or personalizations), to interact directly with VA 275 either under the control of, or in cooperation with, VA interface 220. In some cases, enterprise 250 may have its own switches 260 and customer relationship management (CRM) database 265; in other aspects, all switching may be handled in cloud contact center 200 by router 230 and media server 210, as well as customer database 240. It will be evident to one having ordinary skill that an architecture such as that shown in FIG. 2 may provide for full interoperability of VA 275 and enterprise 250, mediated by cloud contact center 200 with VA interface 220.

Figure 3:
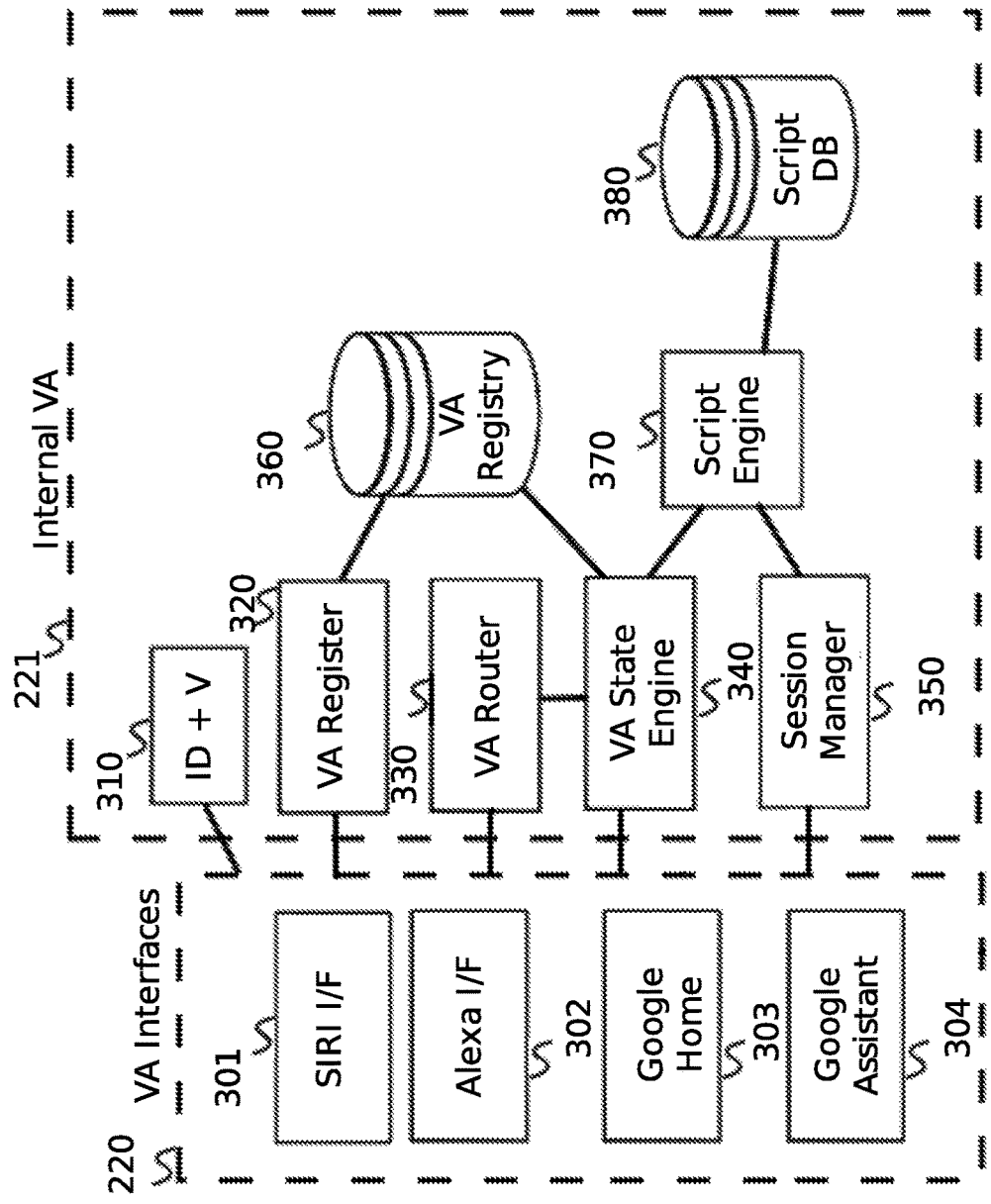
FIG. 3 is a system diagram illustrating a virtual assistant interface design, according to an aspect.

FIG. 3 is a system diagram illustrating a connection between a virtual assistant interface 220, according to an aspect, and an exemplary system architecture for a contact center internal VA 221. VA interface 220 may comprise one or more platform-specific VA interfaces 220 that allow messages to be received from and sent to one or more virtual assistant platforms. For example, VA interface 220 may comprise a SIRI™ interface 301, an ALEXA™ interface 302, GOOGLE HOME™ 303, GOOGLE ASSISTANT™ 304, and so on. Various modules may be hosted on and services provided by VA interface 220, including but not limited to: an identification, verification, and authentication (ID&V) service 310 (that may provide ID&V services for users on behalf of, in addition to, or instead of ID&V by VA platform providers, or for VA's that operate independently without a platform provider), a VA register service 320 (that provides for API-based registration of new VA instances of known types), a VA router service 330 (that route requests from VA 275 to an appropriate resource associated with cloud contact center 200 or one or more enterprises 250), a VA state engine 340 (that maintains specialized state information and computes statistics pertaining to VA 275 as well as internal VA 221 and enterprise bots 251), and a session manager 350 for instantiating VA interaction sessions, maintaining session-level state and variables, and managing/killing sessions as appropriate. VA interface 220 will typically maintain a VA registry 360, although a third party may also provide such a registry. In an aspect, VA 275 registers via VA registration service and thereupon a data object corresponding to VA 275 is entered into and maintained in the VA registry 360. A script engine 370 may load and run scripts maintained in a script database 380, and control operations of specific sessions using session-appropriate scripts and data/events from VA state engine 340, and driving thereby the behavior of a plurality of VA 275 interactions.

Figure 4:
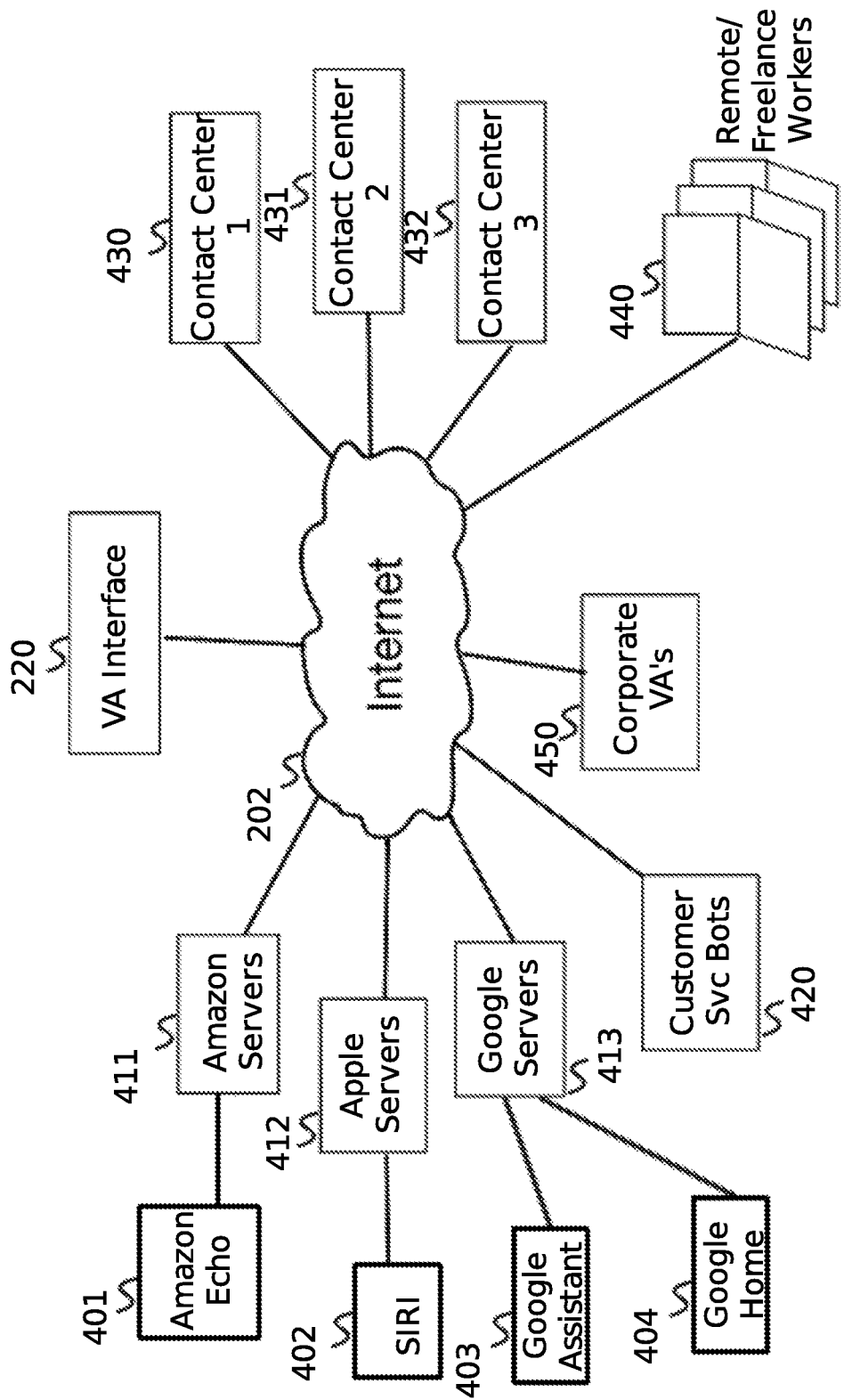
FIG. 4 is a system diagram of an architecture for a standalone virtual assistant interface service, according to an aspect.

FIG. 4 is a system diagram of an architecture for a standalone virtual assistant interface service 220, according to an aspect. The architecture of FIG. 4 is more distributed, and shows interactions directly between a standalone VA interface 220 and a plurality of VA platforms 275, on the one hand, and between the standalone VA interface 220 and a plurality of contact centers 430, 431, 431 (of whatever architecture, as described above) and remote resources such as remote agents 255, remote workers 440, and specialized third party services (for example, third party ID&V services, brokerage services, auction services, and the like). According to a preferred aspect, a VA interface 220 may be connected through the internet 202, to infrastructure provided by corporations which run known VA software 275—including but not limited to Amazon 411 possibly with Amazon Echo 401, Apple 412 possibly with SIRI 402, and Google 413 possibly with Google Assistant 403/Google Home 404. Corporate-run VA's 450, which may be proprietary for individual corporations, and customer service bots and automated systems 420, may also connect through the internet 202 to the VA interface service 220. Through this internet 202 connection, these or other VA 275 software systems, customer service bots 420, and corporate VA's 450, may communicate with a VA interface service 220 who may establish communications protocols and rules, connect to various databases or other internet 202 servers or services as required, to establish communications with various contact centers 430, 431, 432. These contact centers may all be separately owned or operated, and may communicate with a VA interface service 220 to facilitate communications between the numerous disparate VA systems 275 that may communicate with contact centers. Depending on the service requested by a user taking advantage of a VA 275 and using the interface service 220, freelance workers 440 may also be used, and independent agents. Services capable of being requested by a user with this system include many different services normally routed through contact centers and requiring manual call-in from a user, including but not limited to setting up appointments, technical support, making payments for bills, and more, if the service is integrated with a contact center 430, 431, 432 or freelance agent 440 that supports VA interface communication 220.

Figure 5:
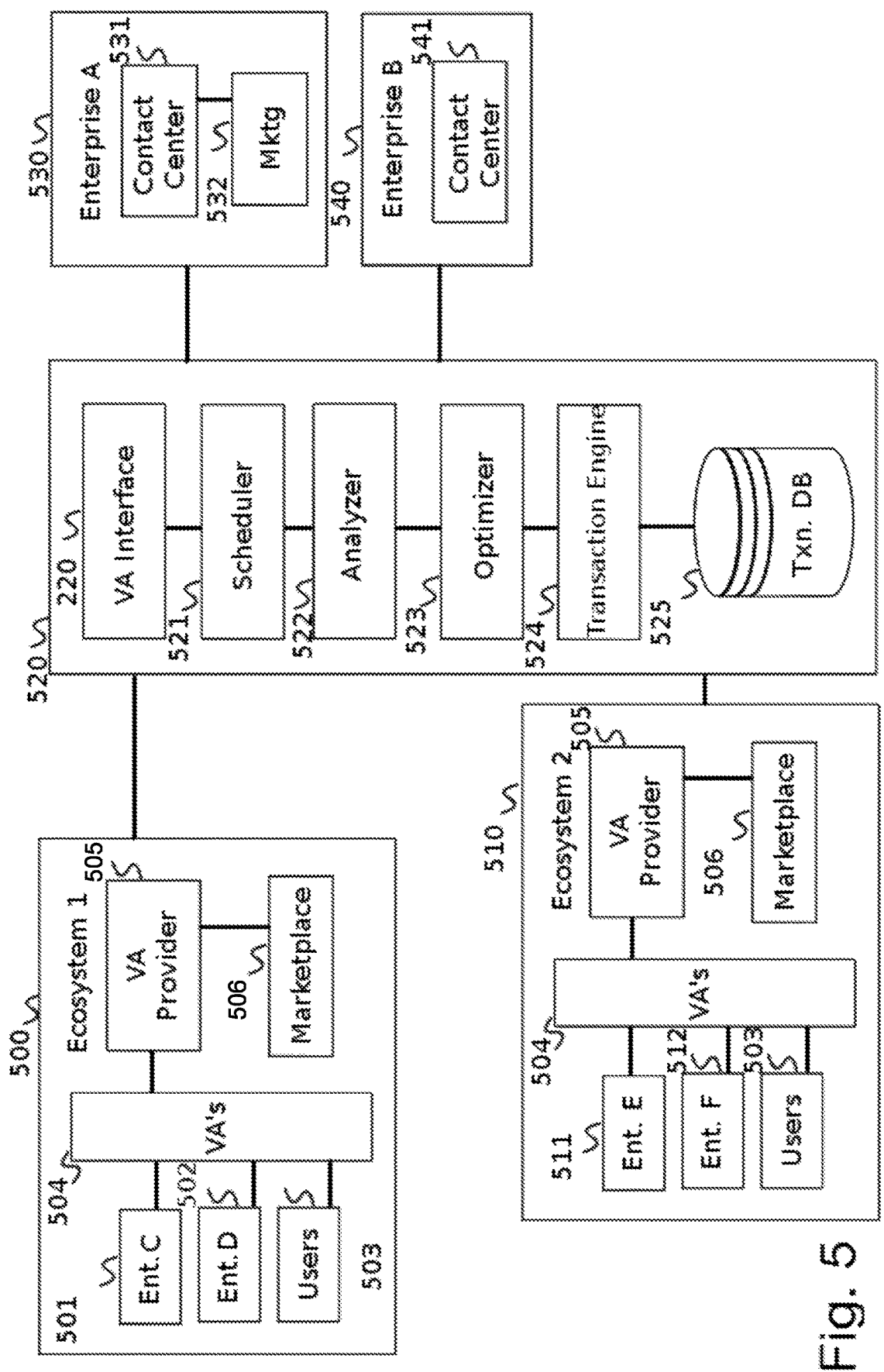
FIG. 5 is a system diagram of an architecture for a service broker using a virtual assistant interface, according to an aspect.

FIG. 5 is a system diagram of an architecture for a service broker using a virtual assistant interface 220, according to an aspect. The architecture shown in FIG. 5 illustrates yet another aspect, where complete ecosystems comprising VA platforms 505, marketplaces 506, VA's 504, and enterprises 501, 502, 511, 512 specific to the ecosystems 500, 510, which interact with a specialized mediation platform 520

(which could be implemented as an added service of cloud contact center 200, but need not be), which itself comprises a VA interface 220, a scheduler 521 (for example, to initiate scheduled VA interaction sessions in either outbound or callback modes), an analyzer 522 (for analyzing the extensive real-time data passing through the interface service), an optimizer 523 (for applying machine learning including but not limited to reinforcement learning, dilated or deep convolutional neural networks, and the like to achieve optimal results against enterprise-specific goals using VA 275 interactions mediated by the mediation service), and a transaction engine 524 with a transaction database 525 (facilitating, for example, the provision of services—competitively sourced by the interface platform—to a plurality of end users 503). Communication may also be accomplished, according to an aspect, with another enterprise 531 with a different ecosystem 530. This enterprise will have a contact center 531 rather than their own VA's 504 and will use a interface system 220 as described earlier, using a contact center 430 as shown in FIG. 4. Such a hypothetical enterprise 530 or 540 may or may not have a separate marketing department 532 which may communicate separately with the contact center 531, 541 or with a VA interface system 220 as the Enterprise dictates.

Figure 6:
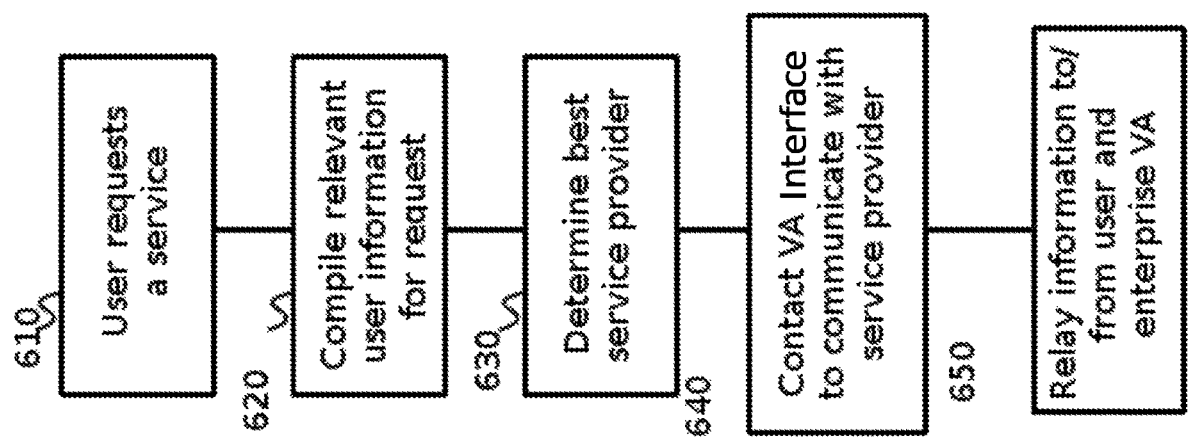
FIG. 6 is a method diagram illustrating an exemplary program flow for a VA, VA interface, and contact center to communicate, according to an aspect.

It will be appreciated by those having ordinary skill in the art that many valuable use cases may be provided by mediated VA services provided using one or more aspects of the present invention. A general program flow is described, according to an aspect, in FIG. 6. The first step in the majority of use cases for this system is that a user will request a service or product 610, which would require interacting with a contact center or service provider in some manner, or dialing a person's individual phone number. The most common VA's on the market (including Cortana, SIRI 402, Amazon Echo 401, and Google Assistant 403) all have information about the user stored in their respective devices or in the cloud, and it is not unreasonable as most in the art would agree, to assume that most commercial VA's will have such, given this precedent. Therefore a VA would compile relevant information that is stored about the user 620, possibly including name, address, payment information, or main computing devices in the household of the user in question, as deemed appropriate by both the VA 275 software and the user. A VA 275 could then, according to a user's request, search for providers of the service or product requested and find best matches for a user to choose from 630, using many possible parameters—including distance to user's home, user's stored preferences for certain things such as music if the request pertains to music, and more. A user may choose the best option from a list provided by the VA, or the VA may automatically choose the best option 630, depending on the implementation of the VA by the manufacturer. Communications through the internet 202 will then be established between the user's VA 275 and a VA interface 220, allowing for the interface to normalize communications between the user's VA 275 and a corporate VA 504 or a corporation's agents 255 or freelance workers 440 as dictated by the enterprise or service provider. Communications that may be passed between the VA interface 220 and the aforementioned corporate resources may include user ID, call ID, user address, and other required information for the enterprise or service provider 640. The interface will then relay information and communications 650 between the user's VA 275 and the corporate VA 504, agents 255, or freelance workers 440.

It will be readily apparent to any skilled in the art that this system and methodology will add functionality for users and enterprises alike, while offering improved operation from close integration with contact center and other enterprise resources that may not be possible with traditional consumer-oriented VA implementations (such as on a smartphone or smartwatch). For example:

Providing contact center and integrated home assistants as end points increases convenience for customers and reduces infrastructure for business that can rely on *aaS solutions for more and more of their business;

If a user asks their VA 275 such as Cortana or SIRI to "order flowers for my mother", deciding which provider 630 connected to the interface fulfills this service will essentially combine search engine and phone call functionality into an easy-to-use voice command;

Take data from an initial "bot" stage of an application flow, and data already known about the user (identity, demographics, credit score, purchase history, etc.) 620, and use this to pre-fill IVR 215 data and data for intelligent routing using cloud contact center 200, updating CRM data 265 as needed and presenting it to agents or enterprise bots 251;

Using bot-gathered data and data known about the user 620, as well as previous interaction history, to trigger a request for a call back from an appropriate agent 650. This could trigger a notification when attempting to set up the call. This would be only one manner of exchanged communications mediated by a VA interface 220.
  a. Frank—"Alexa I'd like to talk to HSBC about my mortgage application" Alexa—"Sure, your normal representative Julie isn't available at the moment, shall I get her to call you back when she's free" Frank—"Yes" . . . some time later (Green light) Alexa—"Julie is ready to talk to you now, shall I put her through?" Frank—"Yes" Julie—"Hi Frank, I can see we just need your solicitors letter to get the mortgage approved, is that what you wanted to talk about?"

When a home assistant gets a purchase request for a service not directly supplied by a VA platform provider, the VA interface 220 could go in real-time to many different suppliers 630 to fulfill the service. One can imagine that in real-time, one has a service that many suppliers could bid for in real-time. Bidding could include many parameters, not just price, so could include reputation scores (93% of customers were satisfied), delivery constraints etc. This is another manner of communications that could be facilitated by the VA interface 220. Data and communications between enterprises and a user's personal VA 275 could be dynamic and diverse to meet business and user needs.
  a. "Alexa could you order a bouquet of flowers for my mother tomorrow" request for summer bouquet delivery to 75 Acacia Avenue, Mansfield, next day response 1 ($50, 94% satisfaction) response 2 ($47, 92% satisfaction)
  b. Which selection to pick would be based on a personality profile of the user, e.g. what is their preferred balance between cost and quality. This profile could come for direct questions and experience built up over time;

A service broker receives a request for service from a virtual assistant 275 of a user (for example, a potential buyer views a real estate listing online and wishes to see the property, requesting the viewing using her virtual assistant), and selects a service provider 630 (for example, by auctioning, or by considering location, price, service quality level, personal "fit", etc.), and negotiates delivery before connecting the service provider to the virtual assistant of the requesting user 650; and Assist a driver, via the driver's virtual assistant 275, to select optimal work patterns (wherein the driver may shift from driving service A to driving service B dynamically based on market conditions in the driver's locale) 630, in managing her work. The VA interface 220 may negotiate with bots 251 or apps of the two (or more) driving service companies on behalf of the driver, while interacting with the driver using the driver's virtual assistant.

Automation of certain web services, including payment of bills using already in place payment services (such as PayPal, Google Pay or Amazon Pay and online debit card transactions), wherein a user may simply tell their VA 275 to, for example, pay their phone bill using information the VA 275 may gather or have stored 620, possibly the user may speak a passcode aloud, and the phone bill may be paid for that month. Similar concepts of paying for bills may be implemented using this system.

Connectivity with other web services such as popular blogging websites (tumblr, blogspot, and more), or website design, for basic functionality, if the VA 275 is able to store or query the user for information pertaining to their website 620. For example, a user could request their VA 275 to remove their last blog post so they can review it and edit it later, and this request would be passed to a bot 251 operated by the enterprise in charge of the web service. They could also request their VA to add a search bar to their website, for users to search their website for desired material. Success or failure to perform the action could be communicated back to the VA 650, and additional queries for information may also be passed, if additional parameters are required as determined by a VA.

Services that may be purchasable with a VA's help may include things such as airline tickets or hotel reservations, wherein the user may specify required information 620 and the VA could report options and prices to the user 630, for final decision making, before communicating the ticket or reservation purchase to the enterprise bot 251, 650. This archetype of interaction extends beyond these two examples.

Contact and call center functionality may be associated with tech-support services, in the minds of many consumers. A user may be able to ask their VA to contact technical support for a given product or service either in the form of a complete query or with the VA querying additional information from a user 620, and the VA may wait on hold instead of the user, drastically reducing frustration for many. VA use may also provide additional avenues for support, such as using video or photo assistance that might ordinarily be difficult or impossible (for example, a user might be able to take a photo of a malfunctioning device for tech support, or a video of the troubleshooting steps they've performed). Another option could be for a user to ask their VA 275 their specific technical question 620, and through the use of online searching and tech-support automated calling 650, give the user several common suggestions on how to fix their problem, eliminating the need to speak with a human at all. A VA may also be able to passively monitor environmental cues, such as sensor information (for example, any of the wide variety of hardware sensors readily available in smartphones or IoT devices) or audio listening, for example a VA may overhear audio from a television and proactively notify a user of updates to a news story or alert them that the story is "fake news", after cross-referencing the information through online sources or services in the background.

Other functionality for automated services and more may exist which is not anticipated by this disclosure, but may be covered by the aspects specified already.

Figure 7:
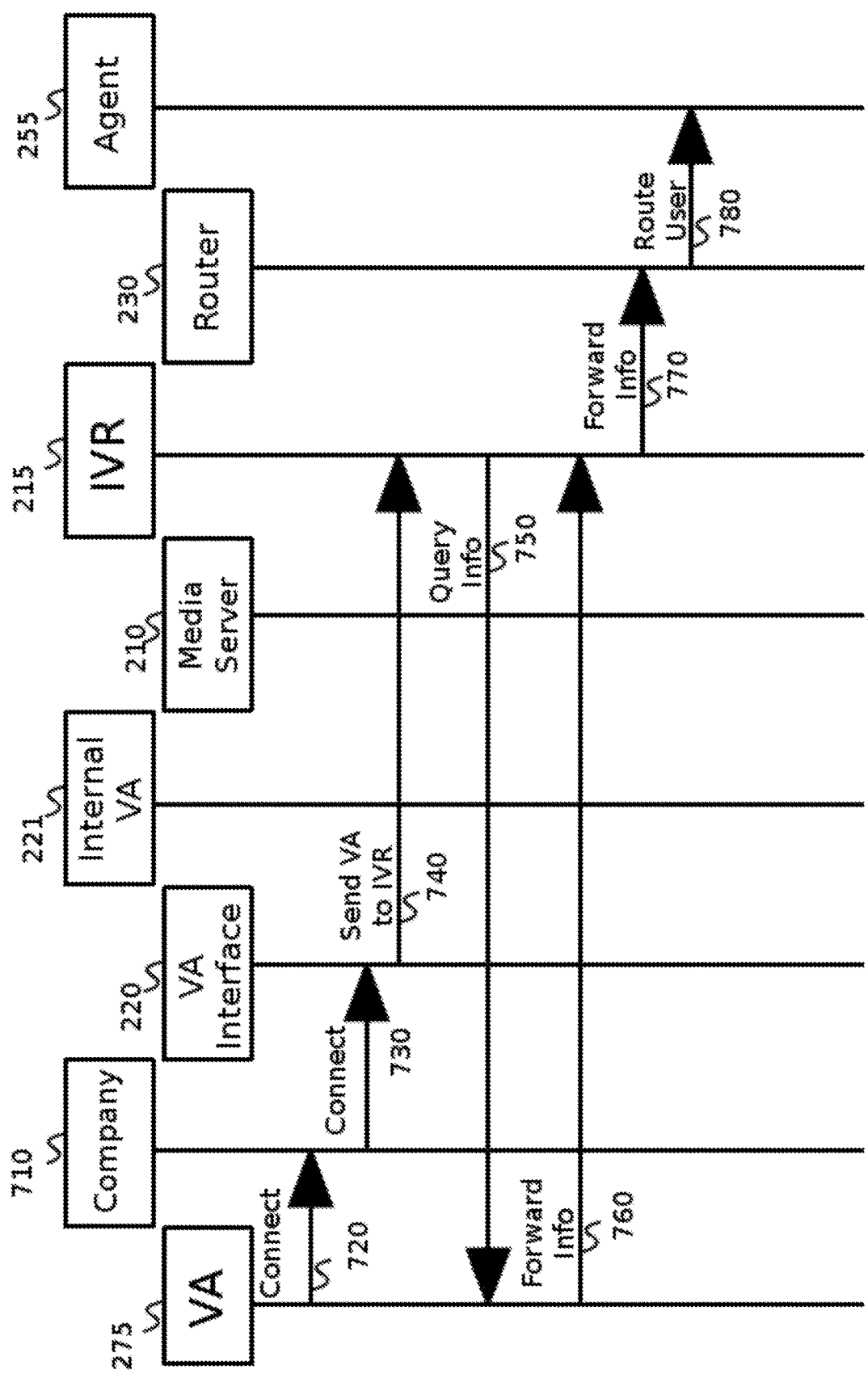
FIG. 7 is a message flow diagram illustrating possible communication between a call center IVR, VA interface, and call center router, according to an aspect.

FIG. 7 is a message flow diagram illustrating one possible exchange of messages between a customer's VA 275, a parent corporation's infrastructure 710 (as is common for virtual assistants in the current state of the art), a cloud-enabled VA interface 220, a contact center's internal VA 221, a contact center's media server 210, interactive voice response 215 found in many contact centers, a call router 230 which is also often found in contact centers, and an agent or agents to route users to 255 from the contact center. The first message will in most cases be the consumer VA interface 275 communicating over the internet protocol with the infrastructure of their parent corporation 710, 720, such as Apple, Amazon, Google, or the like—this is commonly done with virtual assistants to assist in their operation. The corporation's infrastructure will then assist the virtual assistant in opening a connection over internet protocol 730 with a contact center's virtual assistant interface 220, before the VA interface 220 forwards the customer's virtual assistant 275 to create a connection with the cloud-enabled contact center's interactive voice response 215, 740. Through this connection (formed either over internet protocol or a PSTN network) the contact center IVR 215 will then query information from the customer's VA 275 in a similar manner, conceptually, to how an IVR might ask a human user for information 750, for call center routing purposes or to determine sentiment information from voice information provided by VA 275. The customer's VA 275 may then fill in any information it may already have, or ask the user for any missing information, in place of the user speaking directly with an IVR 215 system, and the VA 275 will then forward that information to the IVR 215 in place of the user themselves 760. As is typical for most contact center IVR 215 systems, the complete information will then be run through a script and send the user and any relevant information through a call router 230, 770, to be routed to an agent or agents 255 as determined by the contact center 780.

Figure 8:
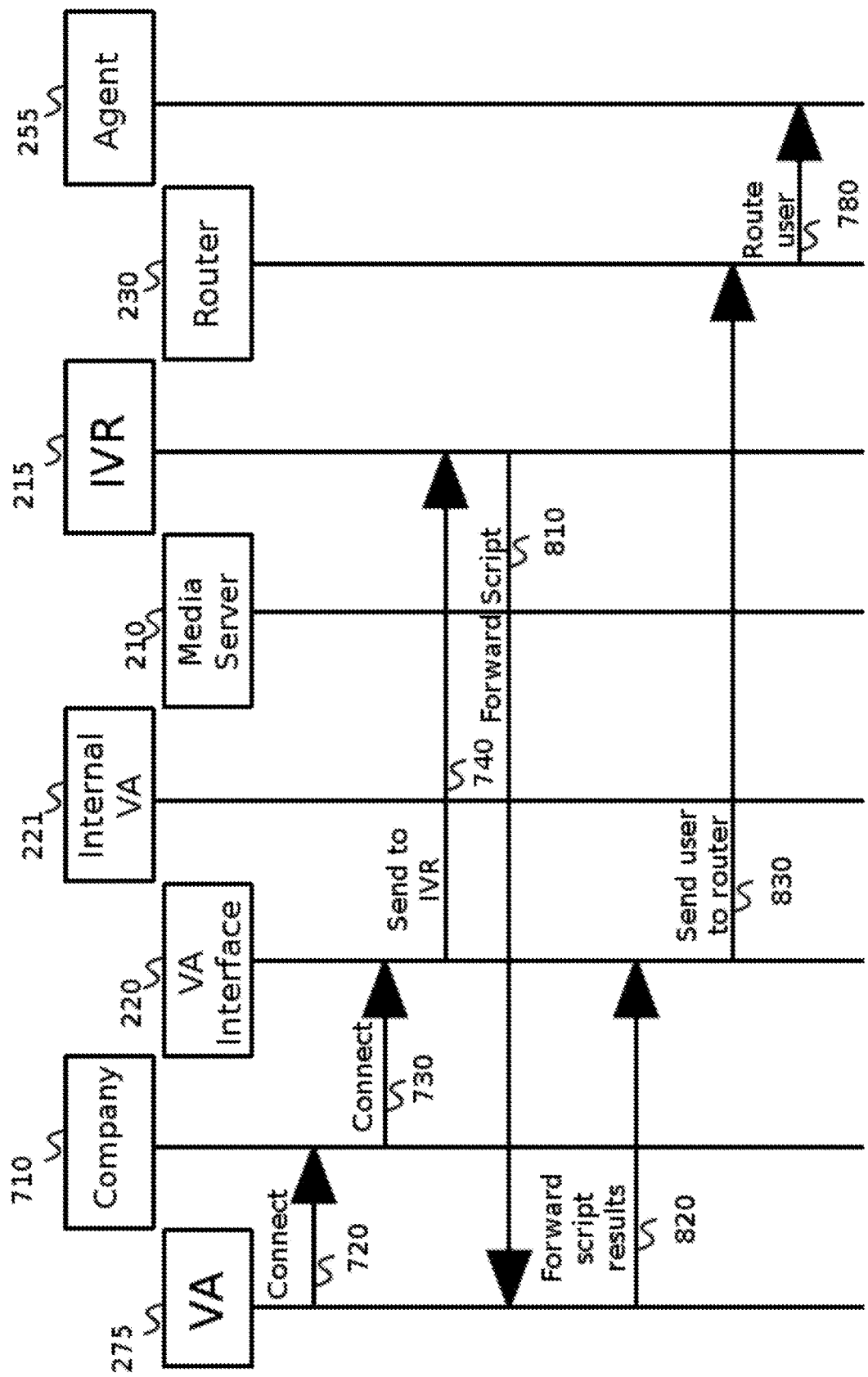
FIG. 8 is a message flow diagram illustrating another possible communication process between a call center IVR, VA interface, and a call center router, according to an aspect.

FIG. 8 is a message flow diagram depicting a different use case using a similar system architecture to FIG. 7. The first three steps are identical to FIG. 7—the user's VA 275 will connect to their corporate 710 infrastructure 720 for any necessary functionality, and then connect to a VA interface 220 for eased communications with internal contact center components 730, before being forwarded to the contact center's IVR 215 system 740. From there however there are major differences in the approach, as depicted in the next message in the diagram, whereby the IVR 215 sends the call script to the user's VA 275 to be run on the VA 275 rather than on the IVR 215 itself 810, thereby no longer requiring a connection to the contact center's IVR 215. A user's VA 275 may then run the script in place of the contact center's IVR 275, and may ask any required information of the user without connection to the IVR 275 component. Information gathered from this may then be used to connect to the contact center's VA interface 220, 820, before sending the user through the corporate router 230, 830, to be routed through the contact center to an agent or agents 255, 780.

Figure 9:
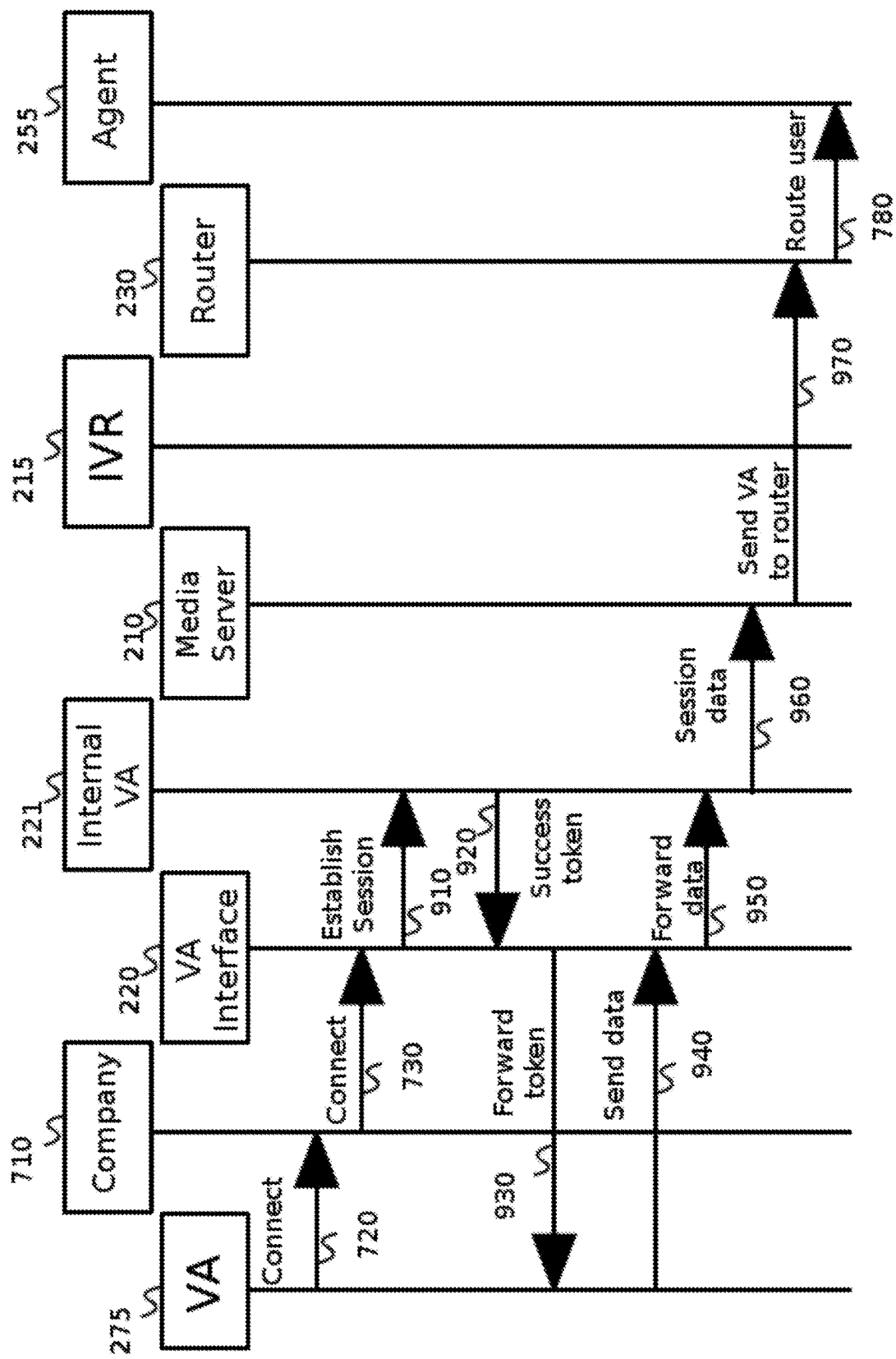
FIG. 9 is a message flow diagram illustrating another possible communication process between a call center internal VA, VA interface, consumer VA, and standard contact center components, according to an aspect.

FIG. 9 is a message flow diagram depicting a different use case using a similar system architecture to FIG. 7 and FIG. 8. The first two steps are identical to the ones in FIG. 7 and FIG. 8, connecting a user's VA 275 to the VA's corporate infrastructure 710 for any functionality not provided locally (as is commonplace in some instances of modern virtual assistants using a wi-fi or cellular data connection) 720, and then connecting to a cloud-enabled contact center's VA interface 220, 730. A next possible step for integration with virtual assistants and contact centers may be to establish a session between the user's VA 275 and the contact center's internal virtual assistant software 221, 910, for which a token—indicating either success or failure—will be sent back to the virtual assistant interface 220, 920. Such token usage is common and may be implicit in parts of the other use cases of this invention, and is listed here only for explanation in this use case in particular. This token may be forwarded to the customer's virtual assistant 275 to indicate success or failure of the connection 930. A user's VA 275 may then send relevant data about the user as required by the internal VA 221 for the call or request performed, to the VA interface 220, 940, which may then be forwarded to the internal VA 221, 950. Session data useful for the contact center to process and/or store for future analysis may then be sent to the contact center's media server 210, 960, and from there, the user's virtual assistant 275 will be sent to the router 230 using data gathered between the interaction of the internal VA 221 and user's VA 275, 970, to be routed through to an agent or agents as determined by the contact center's router 780.

Figure 14:
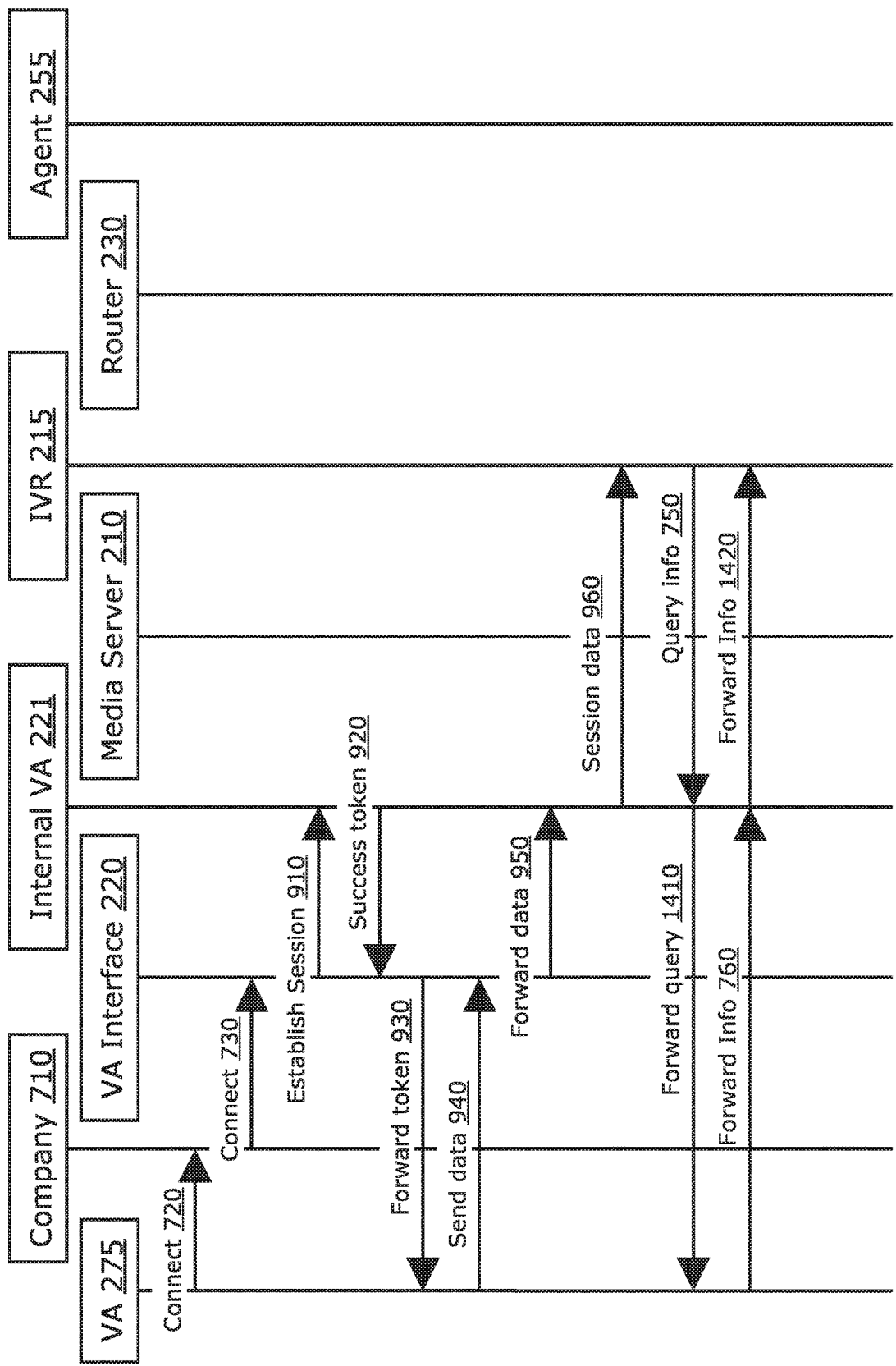
FIG. 14 is a message flow diagram illustrating another possible communication process between a call center internal VA, VA interface, consumer VA, and standard contact center components, according to an aspect.

FIG. 14 is a message flow diagram illustrating another possible communication process between a call center internal VA, VA interface, consumer VA, and standard contact center components, according to an aspect. This illustration combines various messaging aspects of FIGS. 7 and 9. The first two steps are identical to the ones in FIG. 7 and FIG. 8, connecting a user's VA 275 to the VA's corporate infrastructure 710 for any functionality not provided locally (as is commonplace in some instances of modern virtual assistants using a wi-fi or cellular data connection) 720, and then connecting to a cloud-enabled contact center's VA interface 220, 730. A next possible step for integration with virtual assistants and contact centers may be to establish a session between the user's VA 275 and the contact center's internal virtual assistant software 221, 910, for which a token—indicating either success or failure—will be sent back to the virtual assistant interface 220, 920. Such token usage is common and may be implicit in parts of the other use cases of this invention, and is listed here only for explanation in this use case in particular. This token may be forwarded to the customer's virtual assistant 275 to indicate success or failure of the connection 930. A user's VA 275 may then send relevant data about the user as required by the internal VA 221 for the call or request performed, to the VA interface 220, 940, which may then be forwarded to the internal VA 221, 950. At this point, session data is forwarded to an internal system within the contact center, but instead of the media server 210 as in FIG. 9, the session data is sent to the IVR 215. As in FIG. 7, the IVR 215 will then query information from the customer's VA 275 in a similar manner, conceptually, to how an IVR might ask a human user for information 750, for call center routing purposes or to determine sentiment information from voice information provided by VA 275. In this example, however, the query is sent first to the internal virtual assistant 221, which then forwards the query 1410 to the customer's VA 275. The customer's VA 275 may then fill in any information it may already have, or ask the user for any missing information, in place of the user speaking directly with an IVR 215 system, and the customer's VA 275 will then forward that information back in place of the user themselves 760. However, in this example, the information from the customer's VA 275 is received by the internal virtual assistant 221, which then forwards it 1420 on to the IVR 215.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
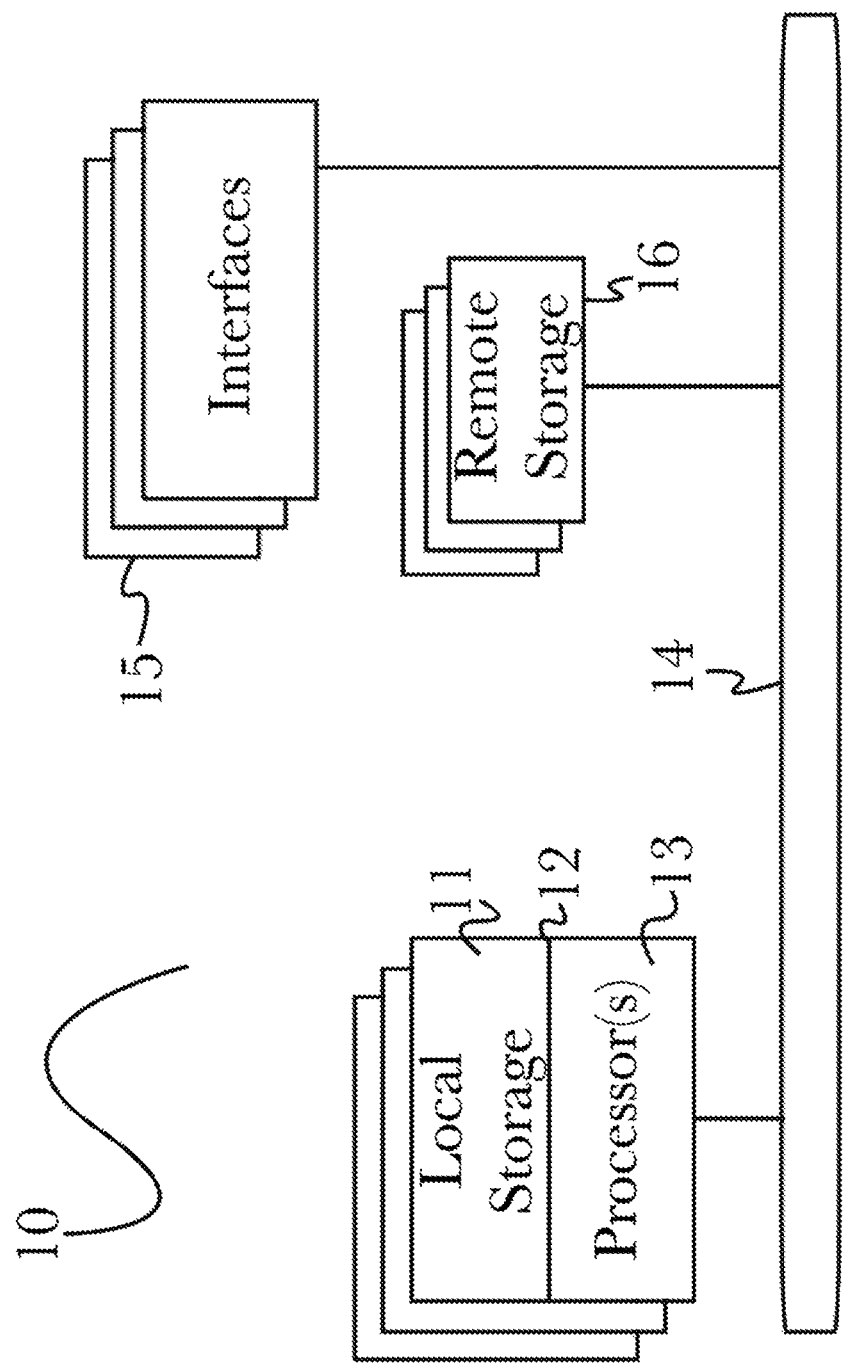
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
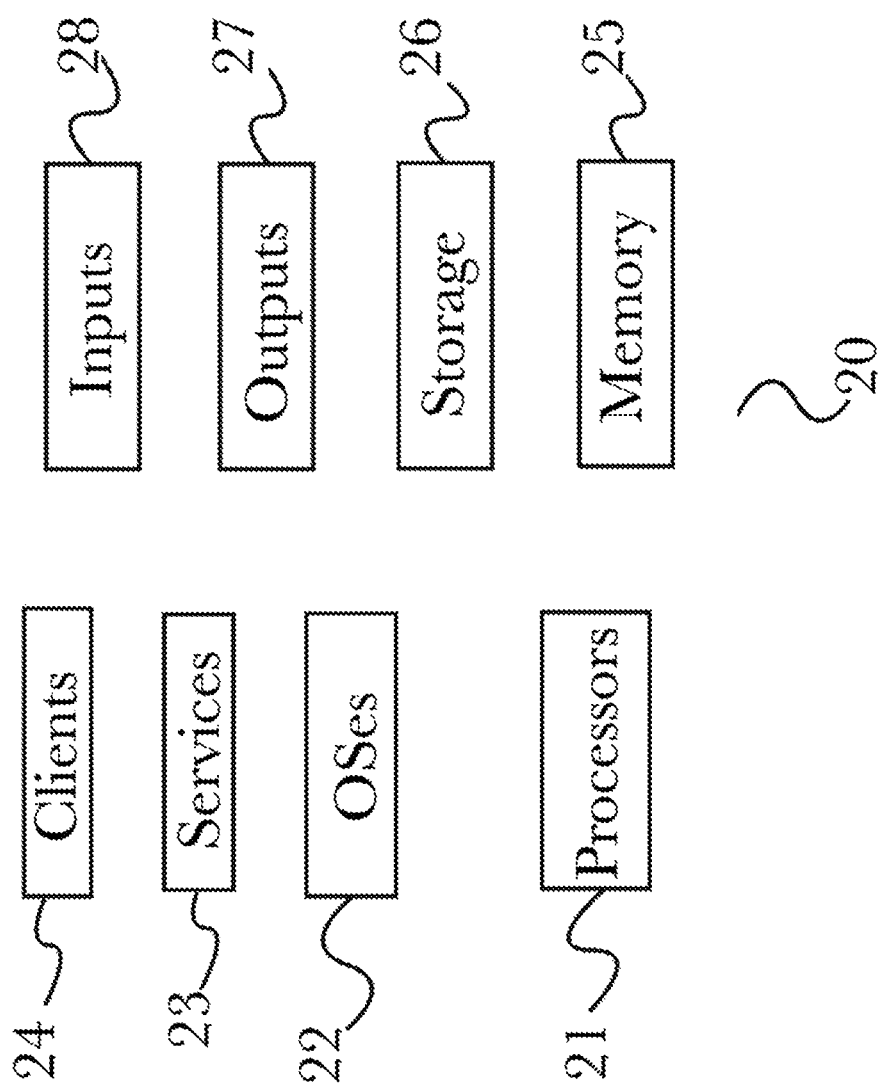
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
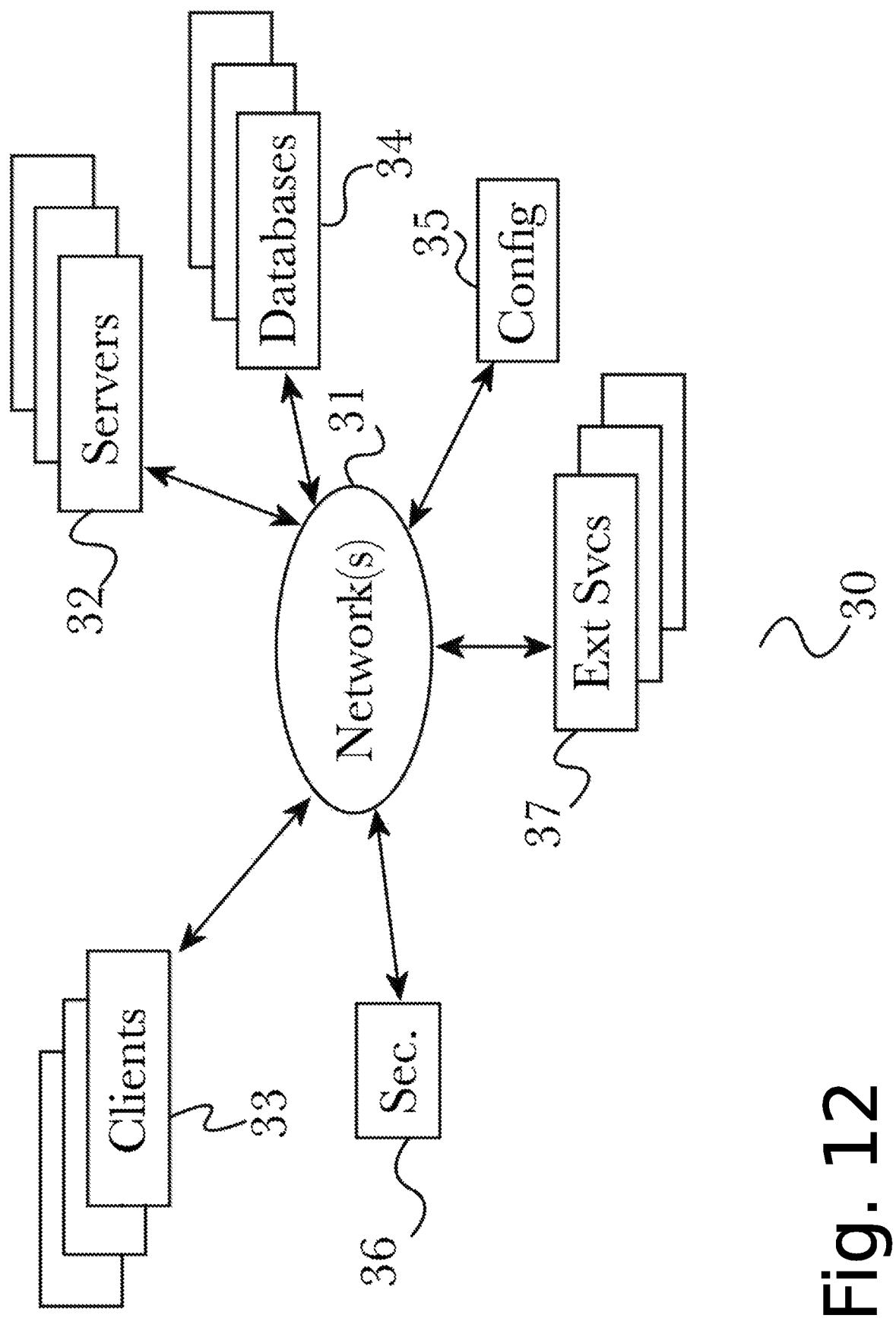
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
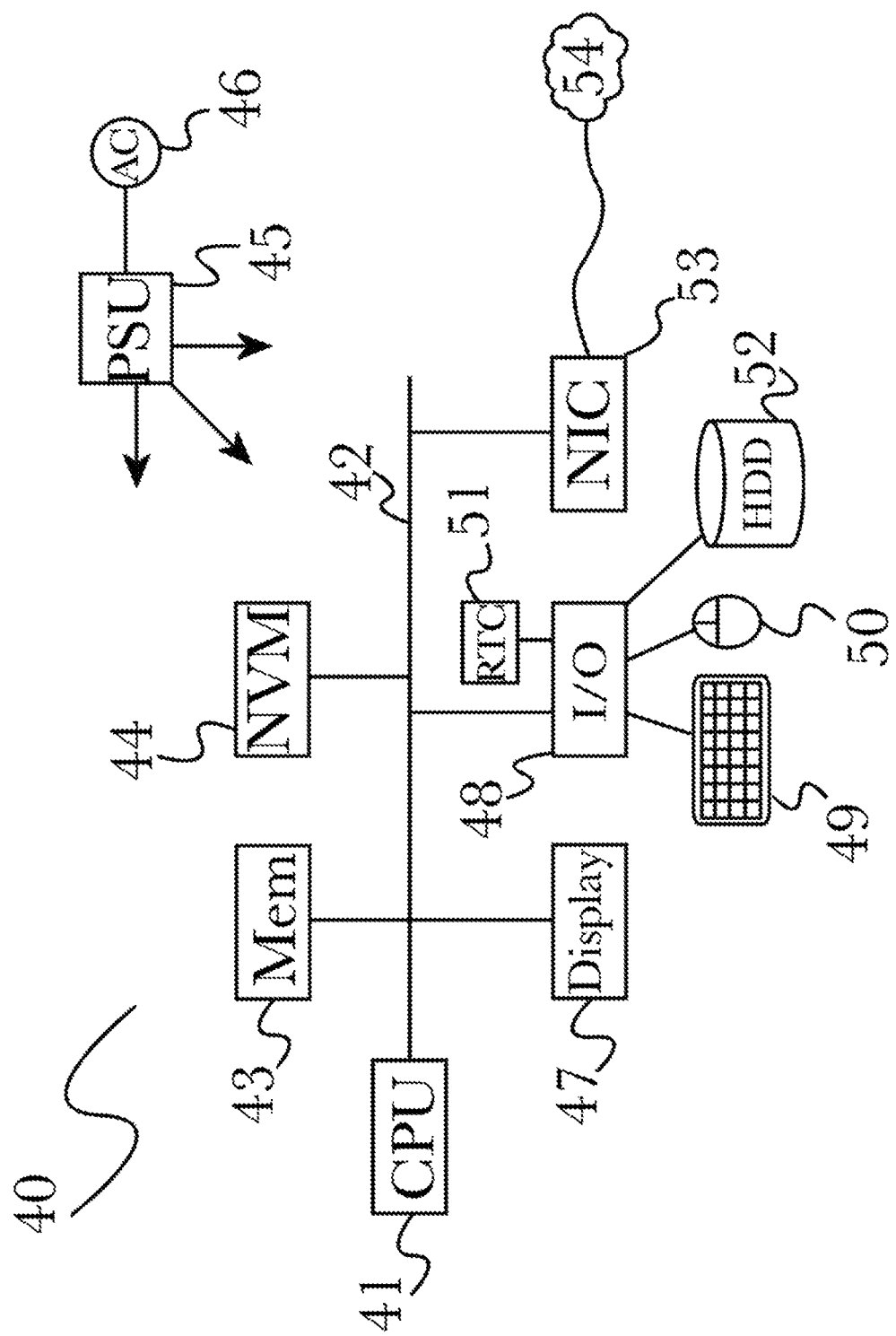
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein.

It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for virtual assistant facilitated contact center communications, comprising:
   one or more contact center internal systems at a contact center, wherein at least one of the one or more contact center internal systems is a network-connected virtual assistant operated by the contact center;
   the network-connected virtual assistant operated by the contact center comprising at least a processor, a memory, and a plurality of programming instructions stored in the memory and executed by the processor, wherein the programming instructions, when executed by the processor, cause the processor to:
   receive a service request from a virtual assistant application operating on a user device over a network;
   connect to the one or more contact center internal systems other than the network-connected virtual assistant via the network;
   exchange messages between the virtual assistant application and the other one or more contact center internal systems, wherein at least one of the other one or more contact center internal systems queries the messages to determine missing information that is required by the other one or more contact center internal systems that is not part of the information contained within the messages, and sends a response to the network-connected virtual assistant;
   receive the response from the one or more other contact center internal systems; and
   query the virtual assistant application to request the missing information.

2. The system of claim 1, wherein the user device is a smartphone.

3. The system of claim 1, wherein the user device is a virtual assistant platform.

4. The system of claim 1, wherein the network is the Internet.

5. The system of claim 1, wherein the network is a public switched telephony network.

\* \* \* \* \*